(12) United States Patent
Himeno et al.

(10) Patent No.: US 8,771,836 B2
(45) Date of Patent: Jul. 8, 2014

(54) RESIN COMPOSITION AND METHOD FOR PRODUCTION THEREOF, AND ROLLING BEARING AND SLIDING BEARING

(75) Inventors: Yoshihide Himeno, Mie (JP); Masaki Egami, Mie (JP); Eiichirou Shimazu, Mie (JP)

(73) Assignee: NTN Corporation, Osaka (JP)

( * ) Notice: Subject to any disclaimer, the term of this patent is extended or adjusted under 35 U.S.C. 154(b) by 145 days.

(21) Appl. No.: 13/388,048

(22) PCT Filed: Jul. 29, 2010

(86) PCT No.: PCT/JP2010/062765
§ 371 (c)(1),
(2), (4) Date: Jan. 30, 2012

(87) PCT Pub. No.: WO2011/013737
PCT Pub. Date: Feb. 3, 2011

(65) Prior Publication Data
US 2012/0128281 A1 May 24, 2012

(30) Foreign Application Priority Data

Jul. 31, 2009 (JP) ................................. 2009-179322

(51) Int. Cl.
*F16C 33/44* (2006.01)
*F16C 33/78* (2006.01)
*C08L 67/00* (2006.01)
*C08L 77/00* (2006.01)

(52) U.S. Cl.
USPC ................ 428/474.4; 384/7; 384/13; 384/51; 384/91; 384/94; 384/108; 384/276; 384/279; 384/297; 384/445; 384/456; 384/523; 384/527; 384/572; 384/623; 384/907; 384/908; 384/909; 384/480

(58) Field of Classification Search
USPC ............ 384/7, 13, 51, 91, 94, 108, 276, 279, 384/297, 445, 456, 523, 527, 572, 623, 907, 384/908, 909; 428/474.4, 480
See application file for complete search history.

(56) References Cited

U.S. PATENT DOCUMENTS

| 4,110,302 A | 8/1978 | Thomas |
| 2007/0155877 A1 | 7/2007 | Shinohara |
| 2007/0265392 A1* | 11/2007 | Shinohara et al. .............. 525/66 |
| 2008/0064826 A1 | 3/2008 | Shinohara |

FOREIGN PATENT DOCUMENTS

| JP | 09-194720 | 7/1997 |
| JP | 10-168661 | 6/1998 |
| JP | 11-080522 | 3/1999 |
| JP | 11-343408 | 12/1999 |
| JP | 2000-281887 | 10/2000 |
| JP | 2006-176597 | 7/2006 |
| JP | 2008-215610 A | 9/2008 |
| JP | 2009-047243 | 3/2009 |
| JP | 2009-155479 | 7/2009 |
| JP | 2010-090364 | 4/2010 |
| WO | 2007061965 A1 | 5/2007 |
| WO | WO2007/133205 | 11/2007 |
| WO | WO2008/030600 | 3/2008 |
| WO | 2010/029869 A1 | 3/2010 |
| WO | WO2010/029869 A1 | 3/2010 |

OTHER PUBLICATIONS

Supplementary European Search Report Jun. 19, 2013.
PCT Search Report dated Nov. 9, 2010.

* cited by examiner

*Primary Examiner* — Ana Woodward
(74) *Attorney, Agent, or Firm* — Hedman & Costigan, P.C.; James V. Costigan; Kathleen A. Costigan

(57) ABSTRACT

It is an object of the present invention to provide a resin composition whose flowability is secured when the resin composition is injection-molded into injection-molded articles such as a resin-made crown-shaped cage and a resin-made seal both for a rolling bearing and a resin-made sliding bearing and which is capable of enhancing the mechanical strengths and toughnesses of these injection-molded articles to such an extent that these injection-molded articles can be used as bearing members. The resin composition is formed into a molded article and used as a bearing member. The resin composition is composed of polyamide resin or polyester resin to which polycarbodiimide is added. The polyamide resin is at least one resin selected from among polyamide 66 resin and polyamide 11 resin. The polyester resin is polytrimethylene terephthalate resin. 0.5 to 6 wt % of the polycarbodiimide is contained in an entirety of the resin composition. A resin-made crown-shaped cage (1) is obtained by injection-molding the resin composition.

3 Claims, 7 Drawing Sheets

(a)  (b)

RESIN COMPOSITION AND METHOD FOR PRODUCTION THEREOF, AND ROLLING BEARING AND SLIDING BEARING

TECHNICAL FIELD

The present invention relates to a resin composition and a method for producing it, and a rolling bearing and a sliding bearing.

BACKGROUND ART

In rotating a rolling bearing incorporating a resin-made cage at a high speed, a centrifugal force generated owing to a high-speed rotation acts on a cage. As a result, the cage deforms. Owing to the deformation of the cage, the friction between the cage and balls held by the cage becomes high, and the torque of the rolling bearing becomes high. An increase of the friction therebetween causes the bearing to generate heat. Further owing to the deformation of the cage, the cage may contact an outer ring of the bearing. Resin melts owing to frictional heat caused by the contact between the cage and the outer ring. Thereby there may be a case where the rolling bearing is prevented from rotating. Thus the resin-made cage to be incorporated in the rolling bearing which is used at a high-speed rotation is an important bearing member.

To restrain the cage from deforming when the rolling bearing rotates at a high speed, it is necessary to increase the mechanical strength and elastic modulus of a resin composition for the cage. To this end, normally this problem is dealt with by increasing the mixing amount of a fibrous reinforcing material such as glass fiber in the resin composition.

A "crown-type cage" is used as the resin-made cage of a deep groove ball bearing which is a kind of the rolling bearing. At a production time of the crown-type cage by injection molding, it is necessary to perform "forcible drawing" to take out a molded article from a semicircular molding die for forming a ball-holding space by spreading claws of the molded article immediately after injection molding finishes. The problem with the forcible drawing is that it is impossible for a resin composition containing a large mixing amount of the fibrous reinforcing material and thus having a low bending strength and a low bending strain (elongation property), particularly the resin composition consisting of polytrimethylene terephthalate (hereinafter referred to as PTT) to permit its own deformation which occurs at the time of the forcible drawing. As a result, troubles such as crack and whitening may occur on the inner-diameter surface of the pocket of the crown-type cage. Similar problems may occur at the time of forming a resin-made seal by injection-molding a resin material. Thus in forcibly drawing a lip from a molding die at a molding time, the resin material for the resin-made seal is incapable of permitting its own deformation and thus cannot be molded owing to the occurrence of the whitening and the crack.

As a measure for dealing with the forcible drawing, an example in which the configuration of the cage is devised to decrease a load at the time of the forcible drawing is reported (see patent document 1). But the cage having the proposed configuration cannot necessarily be so designed that the cage has a high strength. Another problem is that decreasing the load at the time of the forcible drawing in molding the resin material into the cage is synonymous with decreasing a steel ball-holding force of the cage incorporated in the bearing and is thus unpreferable. Therefore there is a demand for the development of a resin material having a high elastic modulus and a high elongation property to such an extent that the resin composition allows the forcible drawing to be accomplished at the molding time. Until now such a resin material does not exist.

The biodegradable plastic composition whose biodegradation speed is adjusted by adding the polycarbodiimide compound to the biodegradable plastic material is known (see patent document 2).

To improve the resistance to hydrolysis in a high-temperature acid medium, the polyamide resin composition containing the polyamide resin and the aliphatic or alicyclic carbodiimide added by 0.01 to 20 parts by mass to 100 parts by mass of the polyamide resin is known (see patent document 3).

To improve the resistance to the hydrolysis, oil, and halogenated metal salts in the high-temperature acid medium, the polyamide resin composition containing the polyamide resin and the aliphatic carbodiimide compound added thereto is known (see patent document 4).

To provide a resin composition excellent in the resistance to the hydrolysis, oil, and heat aging property, the thermoplastic copolymerized polyester resin composition containing the thermoplastic copolymerized polyester resin and the monocarbodiimide compound and/or the polycarbodiimide compound added by 0.01 to 10 parts by weight to 100 parts by weight of the thermoplastic copolymerized polyester resin is known (see patent document 5).

Conventionally the carbodiimide compound is contained in the resin composition to improve its chemical properties such as hydrolyzability. It is not known so far that the addition of the carbodiimide compound to a resin allows the production of a resin composition which has a high elastic modulus and a high elongation property to such an extent that resin composition receives a load applied thereto to a low extent at the time of the forcible drawing in molding it into the cage or the like and thus can be used as a bearing member.

PRIOR ART DOCUMENTS

Patent Documents

Patent document 1: Japanese Patent Application Laid-Open No. 2008-215610
Patent document 2: U.S. Pat. No. 3,776,578
Patent document 3: Japanese Patent Application Laid-Open No. 2006-176597
Patent document 4: Japanese Patent Application Laid-Open No. H11-343408
Patent document 5: Japanese Patent Application Laid-Open No. 2000-281887

SUMMARY OF THE INVENTION

Problem to be Solved by the Invention

The present invention has been made to cope with the above-described problems. It is an object of the present invention to provide a resin composition whose flowability is secured when the resin composition is injection-molded into injection-molded articles such as a resin-made crown-shaped cage and a resin-made seal both for a rolling bearing, and a resin-made sliding bearing and which is capable of enhancing the mechanical strengths and toughnesses of these injection-molded articles to such an extent that these injection-molded articles can be used as bearing members.

Means for Solving the Problem

The resin composition of the present invention is formed into a molded article and used as a bearing member. The resin composition is composed of polyamide resin or polyester resin to which polycarbodiimide is added. The polyamide resin is at least one resin (hereinafter referred to as PA resin) selected from among polyamide 66 resin and polyamide 11 resin. The polyester resin is PTT resin. The polycarbodiimide is contained at 0.5 to 6 wt % in an entirety of the resin composition.

The resin composition contains a fibrous reinforcing material. A mixing amount of the fibrous reinforcing material is 5 to 40 wt % for the entirety of the resin composition. The fibrous reinforcing material is glass fiber or carbon fiber.

In the resin composition of the present invention, the molded article is an injection-molded article. The bearing member is a resin-made crown-shaped cage for a rolling bearing. The bearing member is also a resin-made seal for the rolling bearing.

The rolling bearing of the present invention includes at least one bearing member selected from among the resin-made crown-shaped cage and the resin-made seal as a constituent element thereof. The bearing member is a molded article of the resin composition.

The sliding bearing of the present invention is used for a machine part and is a molded article of the resin composition.

In the method of the present invention of producing the resin composition, the polycarbodiimide is melted and kneaded together with the polyamide resin or the polyester resin with the polyamide resin or the polyester resin being heated up to a temperature not less than a melting point thereof.

Effect of the Invention

Because the resin composition of the present invention is composed of the PA resin or the PTT resin to which the polycarbodiimide is added, the resin composition is allowed to have excellent moldability and improved mechanical strength and toughness. Consequently the injection-molded article to be obtained from the resin composition of the present invention can be preferably applied to a use in which the injection-molded article is required to be forcibly drawn when the injection-molded article is taken out of a molding die or to a use in which the injection-molded article deforms like a snap fit when it is assemble or used. For example, by injection molding, it is possible to produce the resin-made crown-shaped cage, for a rolling bearing, which is thin and has a complicated configuration and a high strength, the resin-made seal for the rolling bearing, and the resin-made sliding bearing.

MODE FOR CARRYING OUT THE INVENTION

Figure 1:
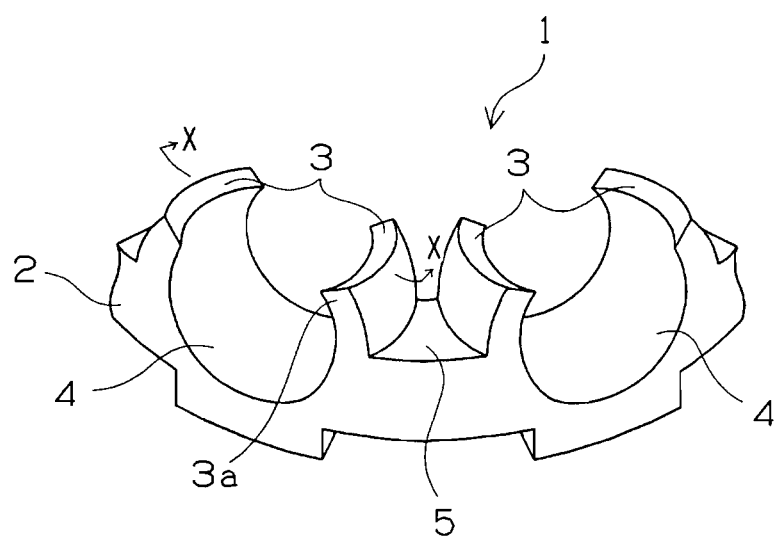
FIG. 1 is a partly enlarged perspective view of a resin-made crown-shaped cage.

An injection-molded article to be obtained from a resin composition of the present invention is obtained by injection-molding a resin composition composed of the PA resin or the PTT resin and the polycarbodiimide added thereto.

As the polyamide resin which can be used in the present invention, the polyamide 66 resin or the polyamide 11 resin are exemplified. In addition, it is possible to use polymer alloy materials formed by mixing the polyamide 66 resin or the polyamide 11 resin, other engineering plastics, and elastomers with one another.

As the PTT resin which can be used in the present invention, it is possible to use any PTT resin, having a polyester structure, which is to be obtained by the reaction between terephthalic acid and 1,3-propanediol. As commercial products of the PTT resin, Sorona produced by DuPont Kabushiki Kaisha. and CORTERRA produced by Shell Inc. are exemplified. In addition, it is possible to use polymer alloy materials formed by mixing the PTT resin, other engineering plastics, and elastomers with one another.

Fibrous reinforcing materials such as glass fiber, carbon fiber, plant fiber, and mineral fiber may be added to the PA resin or the PTT resin. It is preferable to use the glass fiber or the carbon fiber as the fibrous reinforcing material to allow a bearing material to maintain its mechanical strength.

The mixing amount of the glass fiber or the carbon fiber may be as desired, provided that the mixing amount thereof allows a cage or a seal to be formed by molding the resin composition. The mixing amount thereof is favorably not less than 5 wt % nor more than 40 wt % for the entire resin composition. In the case where the glass fiber or the carbon fiber is added to the PA resin, the mixing amount thereof is more favorably not less than 10 wt % nor more than 35 wt %. In the case where the glass fiber or the carbon fiber is added to the PTT resin, the mixing amount thereof is favorably not less than 20 wt % nor more than 35 wt %. When the mixing amount of the glass fiber or the carbon fiber is less than 5 wt %, the injection-molded article has a low bending elastic modulus and deforms to a high extent at a high-speed rotation, and there is a case in which the cage melts owing to contact between the cage and an outer ring. When the mixing amount of the glass fiber or the carbon fiber is more than 40 wt %, the injection-molded article has a low elongation property. Thus even though the polycarbodiimide is added to the PA resin or the PTT resin, there is a possibility that problems such as whitening and the like may occur owing to the forcible drawing when the cage is formed by molding the resin composition.

The polycarbodiimide which can be used in the present invention is a resin having a polycarbodiimide structure in its molecule. The polycarbodiimide is obtained by making a decarboxylation condensation reaction between polyisocyanato and monoisocyanate serving as a molecular weight regulator under the presence of a carbodiimidizing catalyst. Organic diisocyanates are preferable as the polyisocyanate. It is possible to list aromatic diisocyanate, aliphatic diisocyanate, alicyclic diisocyanate, and mixtures of these organic diisocyanates. More specifically, it is possible to list 1,5-naphthalene diisocyanate, 4,4'-diphenylmethane diisocyanate, 4,4'-diphenyldimethylmethane diisocyanate, phenylene diisocyanate, tolylene diisocyanate, hexamethylene diisocyanate, cyclohaxane-1,4-diisocyanate, xylene diisocyanate, isophorone diisocyanate, dicyclohexylmethane-4,4-diisocyanate, methylcyclohexane diisocyanate, tetramethylxylylene diisocyanate, 2,6-diisopropylphenyl isocyanate, and 1,3,5-triisopropylbenzene-2,4-diisocyanate. As monoisocyanate, it is possible to list phenyl isocyanate, tolyl isocyanate, dimethylphenyl isocyanate, cyclohexyl isocyanate, and butyl isocyanate, and naphthyl isocyanate.

As the carbodiimidizing catalyst, it is possible to list 3-methyl-1-phenyl-2-phospholene-1-oxide, 3-methyl-1-ethyl-2-phospholene-1-oxide, 1,3-dimethyl-2-phospholene-1-oxide, 1-phenyl-2-phospholene-1-oxide, 1-ethyl-2-phospholene-1-oxide, 1-methyl-2-phospholene-1-oxide, and double-bond isomers of these carbodiimidizing catalysts. Of these carbodiimidizing catalysts, the 3-methyl-1-phenyl-2-phospholene-1-oxide is preferable because it is industrially easily available. As a commercially available product of the polycarbodiimide, CARBODILITE produced by Nisshinbo Chemical Inc. is exemplified.

The mixing amount of the polycarbodiimide is not less than 0.5 wt % nor more than 6 wt % and favorably not less than 3 wt % nor more than 6 wt % for the entire resin composition. When the mixing amount of the polycarbodiimide is less than 0.5 wt %, it is impossible to sufficiently enhance the mechanical strength and elongation property of the molded article. When the mixing amount of the polycarbodiimide exceeds 6 wt %, the resin composition containing the polycarbodiimide has a high adhesion when the resin composition melts and there is a case where the resin composition adheres to a molding die at a molding time, i.e., defective molding occurs. In addition because the melt viscosity of the resin composition is high, there is a case where kneading and molding cannot be appropriately performed.

Depending on use of the injection-molded article to be obtained by performing the injection molding, the resin composition of the present invention is capable of containing additives such as a deterioration inhibitor and a deterioration prevention agent for restraining deterioration by heat, ultraviolet ray, oxidation or hydrolysis, a plasticizer and a softener for improving moldability and flexibility of the injection-molded article, an antistatic agent, a conductive agent; and a dispersant and a pigment. It is possible to use a shock resistance improving method such as modification by rubber for improving the shock resistance of a molded article and a heat resistance improving method of introducing a crosslinking structure by means of a radical generation agent, a crosslinking agent, radiations, and electron beams into the molded article. In addition, to improve the gas barrier property, waterproof property, repellency, heat resistance, and lubricity of the molded article, it is possible to treat the surface thereof by using an inorganic matter such as diamond-like carbon (DLC) or by using an organic matter such as coating with resin.

In the production method of the present invention, any means can be adopted, provided that the production method has a form including the step of melting the polycarbodiimide and kneading it together with the PA resin or the PTT resin heated up to a temperature not less than the melting point thereof. It is preferable to use a biaxial kneading extruder or a side-feed type biaxial kneading extruder at the melting and kneading step. A pellet obtained by melting and kneading the PA resin or the PTT resin and the polycarbodiimide can be utilized a material for resin molding. Injection molding is preferable as the molding method.

The injection-molded article of the present invention to be obtained by injection-molding the resin composition has a form in which the injection-molded article has a portion to be forcibly drawn in taking out the injection-molded article from a molding die and another form in which the injection-molded article deforms like a snap fit when it is fastened to other members or used as a product. The injection-molded article of the present invention can be preferably applied to these forms.

The injection-molded article of the present invention to be obtained from the resin composition of the present invention secures its excellent injection moldability and has improved mechanical strength and toughness. Thus even the injection-molded article having the portion to be forcibly drawn out can be produced without deteriorating its productivity. As the injection-molded article having the portion to be forcibly drawn out and the injection-molded article which deforms when it is assembled or used, a resin-made crown-shaped cage for a rolling bearing, a resin-made cage required to be assembled, and a resin-made seal for the rolling bearing are listed.

Figure 2:
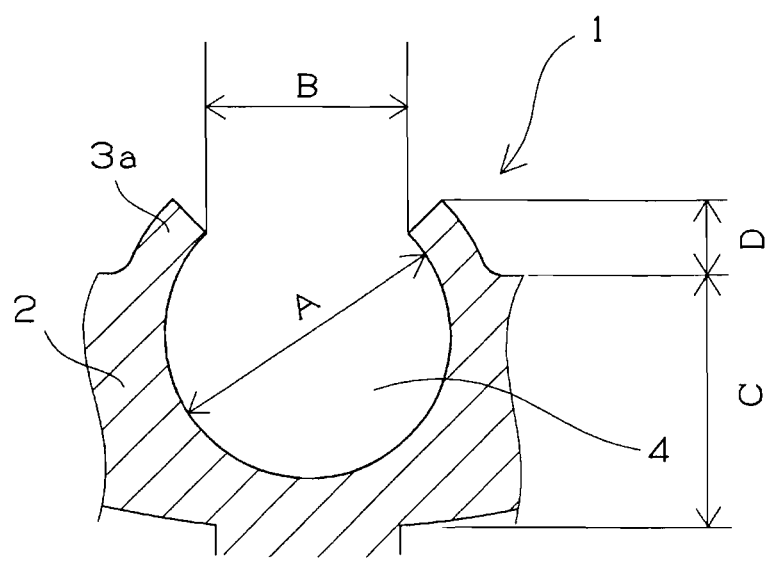
FIG. 2 is a partial sectional view obtained by cutting a pocket of the resin-made crown-shaped cage shown in FIG. 1 along a line X-X.

FIGS. 1 and 2 show an example of the resin-made crown-shaped cage, for a rolling bearing, which is a bearing member of the present invention. FIG. 1 is a partly enlarged perspective view of the resin-made crown-shaped cage formed by integrally molding a resin composition. FIG. 2 is a partial sectional view obtained by cutting a pocket of the resin-made crown-shaped cage shown in FIG. 1 along a line X-X of FIG. 1. In a resin-made crown-shaped cage 1 for the rolling bearing, two pairs of opposed cage claws 3 are formed on an upper surface of an annular cage body 2 at a certain interval in its circumferential direction, and the opposed cage claws 3 of each pair are curved in an approach direction, and a pocket 4 for holding a ball serving as a rolling element is formed between the opposed cage claws 3. A flat portion 5 is formed as a reference plane from which the cage claws 3 rise between the back surface of one of one pair of the opposed cage claws 3 between which the pocket 4 is formed and that of one of the other pair of the opposed cage claws 3 between which the adjacent pocket 4 is formed.

In forming this cage by the injection molding, as shown in FIG. 2, the cage claws 3 having a height D are formed upward on the upper surface of the annular cage body 2 having a thickness of C. The diameter A of the ball-holding pocket 4 is larger than a drawing diameter B of a molding die. Therefore a curved end 3a of the cage claw 3 is forcibly drawn when the molded article is taken out of the molding die. Therefore the curved end 3a of the cage claw 3 may have crack or whitening. Because the above-described resin composition is used in the present invention, it is possible to restrain the crack and the whitening from occurring at the time of the forcible drawing.

Figure 3:
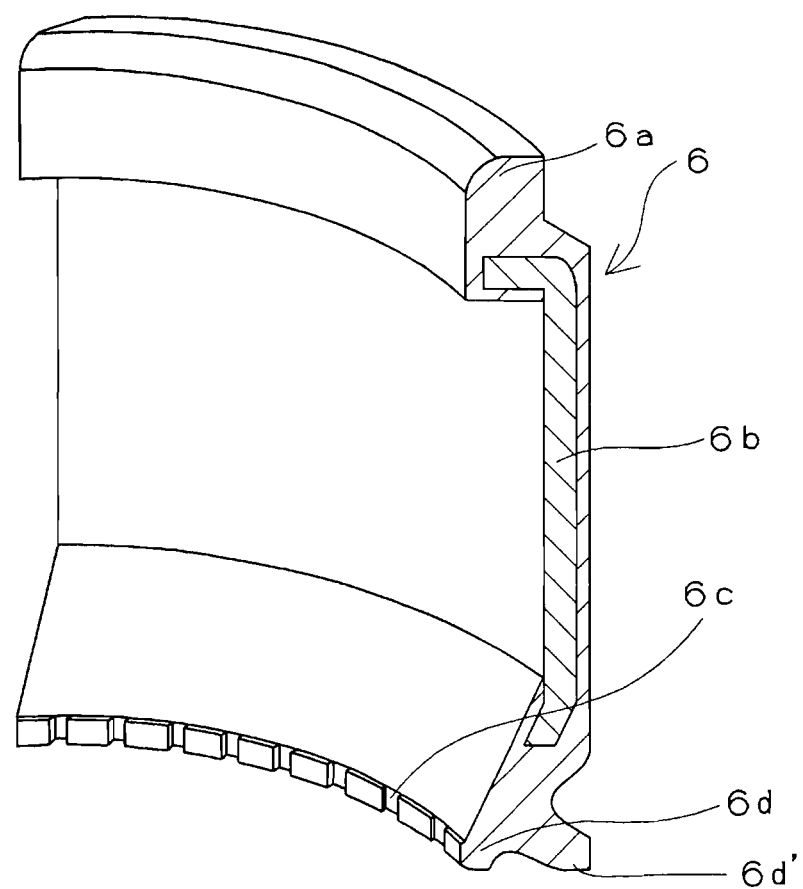
FIG. 3 is a cutout perspective view of a resin-made seal.

FIG. 3 shows an example of the resin-made seal of the present invention for the rolling bearing. FIG. 3 is a cutout perspective view of the resin-made seal. A resin-made seal 6 has a peripheral edge 6a to be locked to a locking groove of a sealing member formed on an inside diameter surface of an outer ring of the bearing, a metal plate (core) 6b reinforcing the sealing member, a seal lip 6d which slides along a sealing groove circumferentially formed at both sides of an inner ring raceway of the bearing, and cutouts 6c formed on the seal lip 6d in a shaft-diameter direction. In forming the seal shown in FIG. 3 by the injection molding, the sealing lip 6d or 6d' is forcibly drawn out of the molding die when the molded article is taken out of the molding die. Thus the sealing lip 6d or 6d' may have crack or whitening. Because the above-described resin composition is used in the present invention, it is possible to restrain the crack and the whitening from occurring at the time of the forcible drawing.

Figure 4:
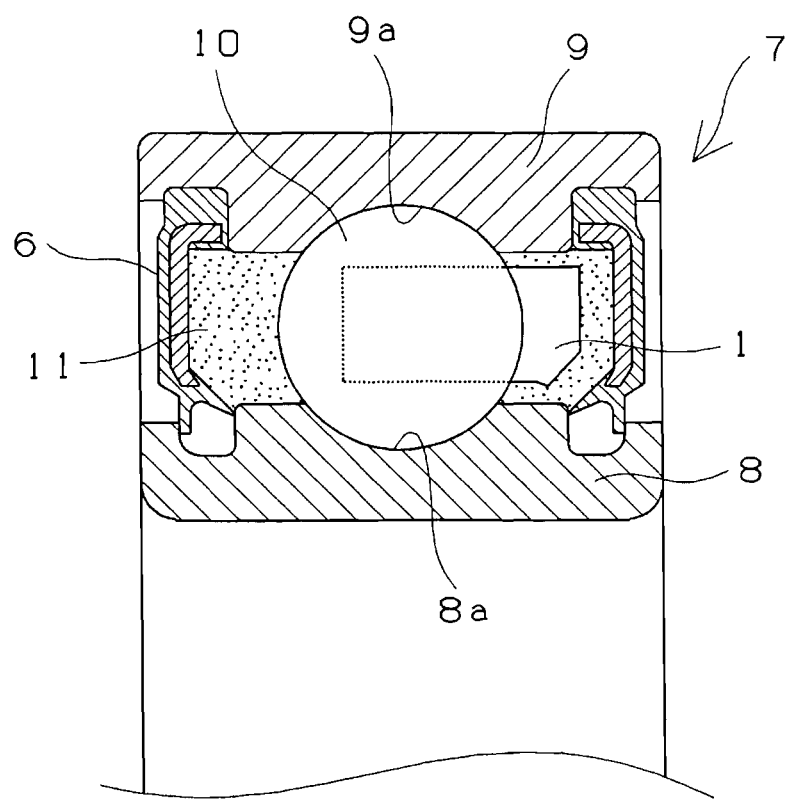
FIG. 4 is a sectional view of a grease-enclosed deep groove ball bearing.

FIG. 4 shows an example of a rolling bearing in which the resin-made crown-shaped cage and the resin-made seal are used. FIG. 4 is a sectional view of a grease-enclosed deep groove ball bearing. In a grease-enclosed deep groove ball bearing 7, an inner ring 8 having a rolling surface 8a on an outer surface thereof and an outer ring 9 having a rolling surface 9a on an inner surface thereof are concentrically disposed, and a plurality of rolling elements 10 are interposed between the rolling surface 8a of the inner ring 8 and the rolling surface 9a of the outer ring 9. The grease-enclosed deep groove ball bearing 7 is constructed of a resin-made crown-shaped cage 1 holding a plurality of rolling elements 10 and a resin-made seal 6 fixed to the outer ring 9. Lubricating grease 11 is applied to the periphery of the rolling elements 10. At least one of the resin-made crown-shaped cage 1 and the resin-made seal 6 is required to be produced by using the molded article of the present invention.

As the method of the present invention for lubricating the rolling bearing of the present invention, in addition to the above-described lubrication which is performed with grease, any of oil lubrication, air oil lubrication, and solid lubrication may be adopted. The rolling bearing of the present invention may be any desired rolling bearing such as a ball bearing, a tapered roller bearing, a self-aligning roller bearing, and a needle roller bearing.

Because the wear resistance of the PA resin or the PTT resin can be improved by adding the polycarbodiimide thereto, the injection-molded article of the resin composition is applicable as a resin-made sliding bearing.

Figure 5:
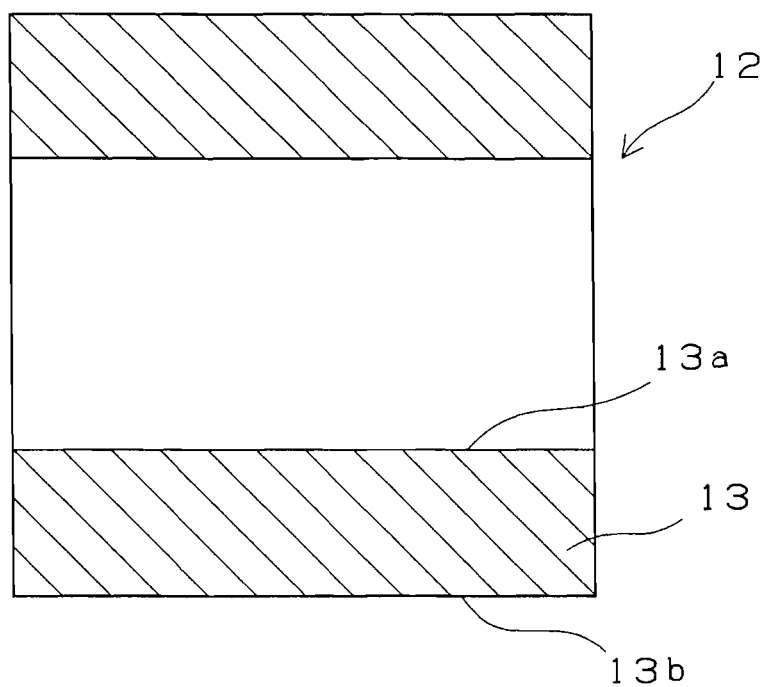
FIG. 5 is a sectional view showing one embodiment of a resin-made sliding bearing of the present invention.
Figure 6:
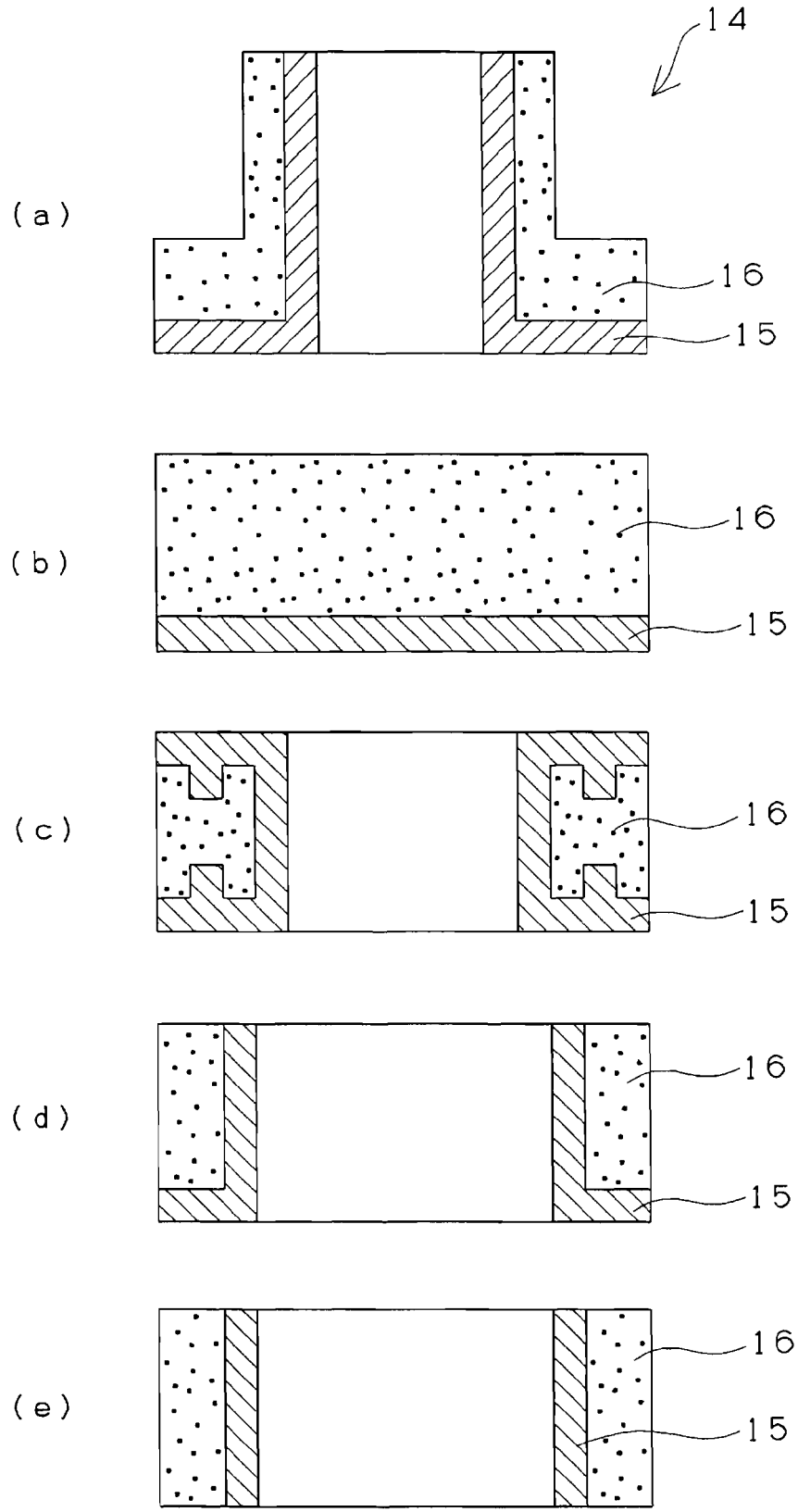
FIG. 6 is a sectional view showing another embodiment of the resin-made sliding bearing of the present invention.

The resin-made sliding bearing of the present invention is described below with reference to FIGS. 5 and 6. FIG. 5 is a sectional view of the resin-made sliding bearing showing one embodiment thereof. FIG. 6 is a sectional view of the resin-made sliding bearing showing other embodiment thereof. As shown in FIG. 5, a resin-made sliding bearing 12 has an inner peripheral surface 13a, of a cylindrical injection-molded article 13, which serves as a sliding surface for a shaft and a peripheral surface 13b, of the cylindrical injection-molded article 13, which is formed oppositely to the inner peripheral surface 13a. The peripheral surface 13b is fixed to a mating material (not shown). The injection-molded article 13 is formed by injection-molding a resin composition composed of the PA resin or the PTT resin consisting of the polyamide 66 resin and/or the polyamide 11 resin and the polycarbodiimide contained by 0.5 to 6 wt % for the entire resin composition.

FIGS. 6(a) through 6(e) are sectional views of the resin-made sliding bearing. A resin-made sliding bearing 14 has an injection-molded article 15 whose sliding surface is made of a resin composition and a sintered metal layer serving as a lubricating oil supply layer 16 disposed oppositely to the back surface of the injection-molded article 15 made of the resin composition. Instead of the sintered metal layer, the injection-molded article 15 made of the resin composition may serve as the lubricating oil supply layer. The configuration of the resin-made sliding bearing 14 includes a flange-attached bush type (FIG. 6(a)), a thrust type (FIG. 6(b)), a radial type (FIG. 6(d)), and a type in which the thrust type and the radial type are mixed with each other (FIGS. 6(c), 6(e)). In dependence on the configuration of a sliding portion, an optimum configuration can be selected. It is possible to form a groove on the sliding surface.

EXAMPLES

Materials used in the examples of the present invention and the comparative examples are shown below. GF shown below indicates glass fiber. Two-digit numbers following after GF indicate the mixing amount (wt %) of the glass fiber contained in each material.

(1) Polyamide 66/GF25: UltramidA3HG5 produced by BASF Corporation (2) Polyamide 11/GF30 (A): Rilsan BZM300TL produced by Arkema Inc.

(3) Polyamide 11/GF30 (B): Rilsan BMNO produced by Arkema Inc.

(4) Glass fiber: CS03-JAFT756D produced by Owens Corning, Inc.

(5) Carbon fiber: HTAC6 produced by Toho Tenax Co., Ltd.

(6) PTT resin/GF30: Sorona3GT produced by DuPont Kabushiki Kaisha.

(7) Polycarbodiimide: CARBODILITE LA-1 produced by Nisshinbo Chemical Inc.

Examples 1 through 8 and Comparative Examples 1 through 6

Resins and fibrous reinforcing materials were melted and kneaded by using a biaxial kneading extruder in the compositions and conditions shown in table 1, and each mixture was pelletized by using a pelletizer. The obtained pellets were molded into dumbbells No. 1 (JIS K 7113) respectively to obtain dumbbell specimens. The obtained dumbbell specimens were subjected to a bending test (three-point bending; JIS K 7171) shown below. The bending strength, bending strain at bending strength, and bending elastic modulus of each dumbbell specimen are shown in table 1. The obtained pellets were subjected to a cage-forming test shown below to evaluate the moldability thereof. Resin-made cage specimens were obtained from the pellets. These resin-made cage specimens had a configuration shown in FIG. 2 in which A: 4.2 mmΦ, B: 3.6 mm, C, 3.6 mm, and D: 0.6 mm. The obtained resin-made cage specimens were subjected to a high-speed rotation test 1 shown below to evaluate the rotational performance thereof at a high speed. In addition to the evaluation of the moldability of the pellets, comprehensive evaluation of the cage specimens shown below was conducted. The obtained dumbbell specimens were subjected to a friction and wear test shown below to measure the specific wear volume thereof respectively when the dumbbell specimens were used as resin-made seals and thereby evaluate the wear resistances thereof. Table 1 shows the results.

<Bending Test>

The obtained dumbbell specimens were subjected to the bending test (three-point bending) conforming to JIS K 7171 to measure the bending strength, bending strain at bending strength, and bending elastic modulus thereof.

<Cage-Forming Test>

By using the obtained pellets, a test for examining the moldability of the cages (cage for deep groove ball bearing, bearing number: 608) having the configuration shown in FIG. 1 was conducted. Pellets which could be favorably molded were evaluated as excellent in the moldability thereof and were recorded as "○". Pellets where whitening was visible in appearance at a curved end portion 3a of the holding claw 3 were recorded as "whitened".

<High-Speed Rotation Test 1>

A high-speed rotation test was conducted for each bearing specimen incorporating one of the obtained cage specimens in conditions shown below.

Bearing specimen: 608ZZ (produced by NTN Corporation; iron plate shield having an outer diameter of 22 mm, an inner diameter of 8 mm, and a width of 7 mm)

Enclosed grease: Multemp SRL (Kyodo Yushi Co., Ltd.)

Amount of enclosed grease:space volume ratio 35 vol %

Load: Fa=3 kgf

Number of rotations: 60000 rpm or 80000 rpm

Test temperature: room temperature

Evaluation period of time: 10 minutes

Evaluation method: The mark of "○" was recorded for bearing specimens which had not less than 60000r in the integrated number of rotations which is the product of the number of rotations of each bearing specimen which was 60000 rpm or 80000 rpm and the period of time (unit: minute)

in which each bearing specimen was rotatable, because the bearing specimens had preferable rotational performance in the high-speed rotation. The mark of "⊚" was recorded for bearing specimens which had not less than 80000r in the integrated product, because the bearing specimens had excellent rotational performance in the high-speed rotation. "Melted" was recorded for bearing specimens in which the cages deformed in the high-speed rotation, and thereby resin melted owing to contact between the cage and an outer ring or the like.

<Comprehensive Evaluation of Cage>

Cage specimens, having the configuration shown in FIG. 1, which did not have problems such as whitening and could be rotated at a high speed were evaluated as excellent in the comprehensive evaluation. Thus the mark of "○" was recorded therefor. On the other hand, cage specimens which had problems in the cage formation or the high-speed rotation test were evaluated as inferior in the comprehensive evaluation. Thus the mark of "x" was recorded therefor.

<Friction and Wear Test>

Figure 7:
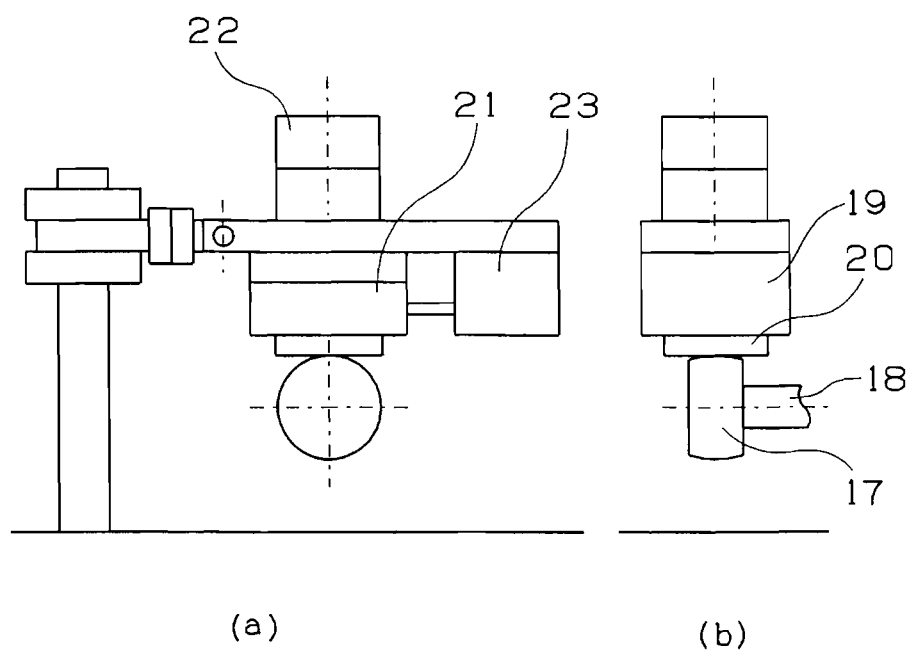
FIG. 7 is a schematic view of a friction and wear test conducted in the present invention.

Ring-shaped specimens were obtained by abrading obtained dumbbell-shaped specimens with sandpaper (#2000) to remove a resin skin layer and thereafter adjusting the surface roughness thereof. A friction and wear test was conducted for the obtained ring-shaped specimens by using a Savan-type friction and wear testing machine. FIG. 7 shows the Savan-type friction and wear testing machine. FIG. 7(a) is a front view thereof. FIG. 7(b) is a side view thereof. A ring-shaped specimen 17 was mounted on a rotational shaft 18, and a steel plate 20 was fixed to an air slider 21 of an arm portion 19. The ring-shaped specimen 17 contacted the steel plate 20 (SCM415: carburized steel quenched and tempered (Hv 700, surface roughness Ra 0.01 μm)) with the ring-shaped specimen 17 rotating, while a predetermined load 22 was being applied to the ring-shaped specimen 17 from an upper portion in FIG. 7. A frictional force generated when the ring-shaped specimen 17 was rotated was detected by a load cell 23. The friction situation of each specimen after the testing machine was operated for a predetermined period of time was checked in terms of a specific wear volume. The test conditions are as shown below.

Mating material: SUJ2
Temperature: Room temperature
Period of time for evaluation: one hour
Circumferential speed: 0.05 m/second
Load: 200N
Lubricating oil: not used

TABLE 1

| | Example | | | | | | | |
|---|---|---|---|---|---|---|---|---|
| | 1 | 2 | 3 | 4 | 5 | 6 | 7 | 8 |
| resin composition (wt %) | | | | | | | | |
| polyamide 66 resin/GF25 | 97 | 99 | — | — | — | — | — | — |
| polyamide 11 resin/GF30 (A) | — | — | 94 | 97 | 99 | — | — | — |
| polyamide 11 resin/GF30 (B) | — | — | — | — | — | 67 | 82 | 67 |
| glass fiber | — | — | — | — | — | 30 | 10 | — |
| carbon fiber | — | — | — | — | — | — | — | 30 |
| polycarbodiimide | 3 | 1 | 6 | 3 | 1 | 3 | 3 | 3 |
| kneading temperature (° C.) | 280 | 280 | 280 | 240 | 240 | 240 | 240 | 240 |
| kneadability | ○ | ○ | ○ | ○ | ○ | ○ | ○ | ○ |
| mechanical properties | | | | | | | | |
| bending strength (MPa) | 349 | 279 | 290 | 285 | 278 | 266 | 164 | 325 |
| bending strain at bending strength (%) | 4.8 | 4.4 | 8.8 | 8.7 | 6.4 | 7.8 | 8.7 | 4.5 |
| bending elastic modulus (MPa) | 7384 | 6474 | 5788 | 5563 | 5317 | 6092 | 5051 | 7256 |
| moldability in forming cage | ○ | ○ | ○ | ○ | ○ | ○ | ○ | ○ |
| rotational performance at high speed | ⊚ | ⊚ | ⊚ | ⊚ | ○ | ⊚ | ○ | ⊚ |
| comprehensive evaluation of cage | ○ | ○ | ○ | ○ | ○ | ○ | ○ | ○ |
| specific wear volume × $10^{-5}$ mm$^3$/(N·m) | 1.89 | 2.21 | 4.01 | 4.13 | 4.56 | 4.04 | 4.86 | 2.94 |

| | Comparative example | | | | | |
|---|---|---|---|---|---|---|
| | 1 | 2 | 3 | 4 | 5 | 6 |
| resin composition (wt %) | | | | | | |
| polyamide 66 resin/GF25 | 100 | — | — | — | — | — |
| polyamide 11 resin/GF30 (A) | — | 100 | 92 | — | — | — |
| polyamide 11 resin/GF30 (B) | — | — | — | 70 | 90 | 70 |
| glass fiber | — | — | — | 30 | 10 | — |
| carbon fiber | — | — | — | — | — | 30 |
| polycarbodiimide | — | — | 8 | — | — | — |
| kneading temperature (° C.) | 1) | 1) | — | — | — | — |
| kneadability | — | — | 2) | ○ | ○ | ○ |
| mechanical properties | | | | | | |
| bending strength (MPa) | 249 | 256 | — | 260 | 131 | 288 |
| bending strain at bending strength (%) | 2.8 | 4.1 | — | 3.9 | 7.7 | 3.2 |
| bending elastic modulus (MPa) | 5985 | 4820 | — | 4751 | 2711 | 6987 |
| moldability in forming cage | whitened | ○ | — | ○ | ○ | whitened |
| rotational performance at high speed | ⊚ | melted | — | melted | melted | ⊚ |
| comprehensive evaluation of cage | X | X | X | X | X | X |
| specific wear volume × $10^{-5}$ mm$^3$/(N·m) | 2.56 | 5.59 | — | 6.24 | 6.74 | 4.32 |

1) materials commercially available were used, not kneaded
2) test was stopped on the way owing to high kneading torque As indicated in table 1, in the cage-forming test, cages which had improved strength and the bending elastic modulus deformed in a small amount when the same amount of a centrifugal force was applied thereto and other cages. Thus the contact between the cages and the outer ring was restrained. Consequently it was possible to improve the integrated limit product of the number of rotations of each bearing specimen. As a result of the comprehensive evaluation of the cages, it was found that in the examples 1 through 8 in which the polycarbodiimide was added to the polyamide 66 resin or the polyamide 11 resin, the bending strain (elongation property) was improved and that thereby the forcible drawing could be accomplished at the molding time. Further it was found that because the cage of each of the examples 1 through 8 had a high elastic modulus, each bearing incorporating the cage was allowed to rotate at a high speed. Further it was found that as a result of the evaluation of the friction and wear test, the specific wear volumes of the resin materials which contained the polycarbodiimide were low and that the wear resistances thereof were improved up to twice as large as those of the resin materials of the comparative examples.

Examples 9 to 11 and Comparison Example 7

Resins and fibrous reinforcing materials were melted and kneaded with the biaxial kneading extruder in the compositions and conditions shown in table 2, and each mixture was pelletized by using the pelletizer. The obtained pellets were molded into dumbbells No. 1 (JIS K 7113) respectively to obtain dumbbell specimens. The obtained dumbbell specimens were subjected to the bending test (three-point bending; JIS K 7171) shown below. The bending strength, bending strain at bending strength, and bending elastic modulus of each dumbbell specimen are shown in table 2. The obtained pellets were subjected to the cage-forming test shown below to evaluate the moldability thereof. Resin-made cage specimens were obtained from the pellets. These resin-made cage specimens had a configuration shown in FIG. 2 in which A: 4.2 mmΦ, B: 3.6 mm, C, 3.4 mm, and D: 0.8 mm. The obtained resin-made cage specimens were subjected to a high-speed rotation test 2 shown below to evaluate the rotational performance thereof at a high speed. In addition to the evaluation of the moldability of the pellets, comprehensive evaluation of the cage specimens was conducted. The obtained dumbbell specimens were subjected to a friction and wear test shown below to measure the specific wear volume thereof respectively when the dumbbell specimens were used as a sealing member and evaluate the wear resistances thereof. Table 2 shows the results.

<High-Speed Rotation Test 2>

By using each bearing specimen in which each of the obtained cage specimens was incorporated, a high-speed rotation test was conducted in conditions shown below.

Bearing specimen: 608ZZ (produced by NTN Corporation; iron plate shield having an outer diameter of 22 mm, an inner diameter of 8 mm, and a width of 7 mm)
Enclosed grease: Multemp SRL (Kyodo Yushi Co., Ltd.)
Amount of enclosed grease:space volume ratio 35 vol %
Load: Fa=3 kgf
Number of rotations: 60000 rpm or 80000 rpm
Test temperature: room temperature
Evaluation period of time: 10 minutes
Evaluation method: The mark of "○" was recorded for bearing specimens which had not less than 100000r in the integrated limit number of rotations which is the product of the number of rotations of each bearing specimen which was 60000 rpm or 80000 rpm and the period of time (unit: minute) in which each bearing specimen was rotatable, because the bearing specimens had preferable rotational performance in the high-speed rotation. "Melted" was recorded for bearing specimens in which the cages deformed in the high-speed rotation, and resin melted owing to contact between the cage and the outer ring or the like.

TABLE 2

|  | Example | | | Comparative example |
|---|---|---|---|---|
|  | 9 | 10 | 11 | 7 |
| resin composition (wt %) | | | | |
| PTT resin/GF30 | 99 | 97 | 95 | 100 |
| carbodiimide compound | 1 | 3 | 5 | — |
| kneading temperature (° C.) | 240 | 240 | 240 | 1) |
| kneadability | ○ | ○ | ○ | — |
| mechanical properties | | | | |
| bending strength (MPa) | 293 | 367 | 371 | 243 |
| bending strain at bending strength (%) | 3.2 | 3.7 | 3.9 | 2.0 |
| bending elastic modulus (MPa) | 8358 | 8550 | 8469 | 7915 |
| moldability in forming cage | ○ | ○ | ○ | whitened |
| rotational performance at high speed | ○ | ○ | ○ | melted |
| comprehensive evaluation of cage | ○ | ○ | ○ | x |
| specific wear volume × $10^{-5}$ mm$^3$/(N · m) | 1.72 | 1.61 | 1.57 | 2.67 |

1) materials commercially available were used, not kneaded

As shown in table 2, in the cage-forming test, even in the case where a large amount of the glass fiber was added to the PTT resin, it was possible to perform injection molding required to subject the cage to the forcible drawing without altering the mixing composition of the filler, although the resin composition which contained the PTT resin could not be molded heretofore. In the high-speed rotation test 2, cages which had improved strength and bending elastic modulus deformed in a small amount when the same amount of a centrifugal force was applied thereto and other cages. Thus the contact between the cages and the outer ring was restrained. Consequently it was possible to improve the integrated limit product of the number of rotations of each bearing specimen. As a result of the comprehensive evaluation of the cage, it was found that owing to the addition of the polycarbodiimide to the PTT resin, the PTT-containing resin composition had an improved elongation property, although the PTT-containing resin composition could not be molded into the configuration of the cage so far and that it was possible to perform the injection molding which requires the forcible drawing in molding the PTT-containing resin composition into the cage. Further it was also found that because the elastic modulus was improved, the resin-made cage specimens could be used at a high rotation speed. As a result of the evaluation of the friction and wear test of the sealing member, it was found that the specific wear volume was small in the PTT resin-containing resin material to which the polycarbodiimide was added and that the wear resistances thereof were improved approximately twice as large as that of the resin material of the comparative example.

INDUSTRIAL APPLICABILITY

The injection-molded article to be used as the bearing member is formed by injection-molding the resin composition of the present invention composed of the PA resin or the PTT resin to which the predetermined amount of the polycarbodiimide is added. Therefore the injection-molded article has improved bending strength, bending strain (elongation property), and bending elastic modulus and is thus high in its elastic modulus and elongation property to such an extent that the injection-molded article can be forcibly drawn from a molding die at a molding time. Therefore the injection-molded article can be preferably utilized as the resin-made crown-shaped cage and the sealing member for the rolling bearing, and the sliding bearing.

| EXPLANATION OF REFERENCE NUMERALS AND SYMBOLS | |
|---|---|
| 1: | resin-made crown-shaped cage for rolling bearing |
| 2: | cage body |
| 3: | cage claw |
| 4: | pocket |
| 5: | flat portion |
| 6: | resin-made seal |
| 7: | grease-enclosed deep groove ball bearing |
| 8: | inner ring |
| 9: | outer ring |
| 10: | rolling element |
| 11: | lubricating grease |
| 12: | resin-made sliding bearing |
| 13, 15: | injection-molded article of resin composition |
| 14: | sliding bearing made of resin |
| 16: | base material or sintered metal body |
| 17: | ring-shaped specimen |
| 18: | rotational shaft |
| 19: | arm portion |
| 20: | steel plate |
| 21: | air slider |
| 22: | load |
| 23: | load cell |

The invention claimed is:

1. A rolling bearing comprising an inner ring having a rolling surface on an outer surface thereof, an outer ring having a rolling surface on an inner surface thereof, a plurality of rolling elements interposed between said rolling surface of said inner ring and said rolling surface of said outer ring, and a crown-shaped resin cage holding a plurality of said rolling elements wherein said crown-shaped resin cage is an injection-molded article of a resin composition
   wherein said resin composition comprises either polyamide resin in combination with polycarbodiimide or polyester resin in combination with polycarbodiimide
   wherein said polyamide resin is at least one resin selected from the group consisting of polyamide 66 resin and polyamide 11 resin; said polyester resin is polytrimethylene terephthalate resin; and
   wherein said resin composition contains from 0.5 to 6 wt % of said polycarbodiimide based on the total weight of said resin composition.

2. A rolling bearing comprising an inner ring having a rolling surface on an outer surface thereof, an outer ring having a rolling surface on an inner surface thereof, a plurality of rolling elements interposed between said rolling surface of said inner ring and said rolling surface of said outer ring, and a resin seal wherein said seal is a molded article of a resin composition
   wherein said resin composition comprises either polyamide resin in combination with polycarbodiimide or polyester resin in combination with polycarbodiimide
   wherein said polyamide resin is at least one resin selected from the group consisting of polyamide 66 resin and polyamide 11 resin; said polyester resin is polytrimethylene terephthalate resin; and
   wherein said resin composition contains form 0.5 to 6 wt % of said polycarbodiimide based on the total weight of said resin composition.

3. A sliding bearing which is used for a machine part, said sliding bearing being a molded article of a resin composition
   wherein said resin composition comprises either polyamide resin in combination with polycarbodiimide or polyester resin in combination with polycarbodiimide
   wherein said polyamide resin is at least one resin selected from the group consisting of polyamide 66 resin and polyamide 11 resin; said polyester resin is polytrimethylene terephthalate resin; and
   wherein said resin composition contains from 0.5 to 6 wt % of said polycarbodiimide based on the total weight of said resin composition.

* * * * *